Dec. 14, 1943.   C. V. LITTON   2,336,488
METAL SEAL MEMBER
Filed Jan. 31, 1942
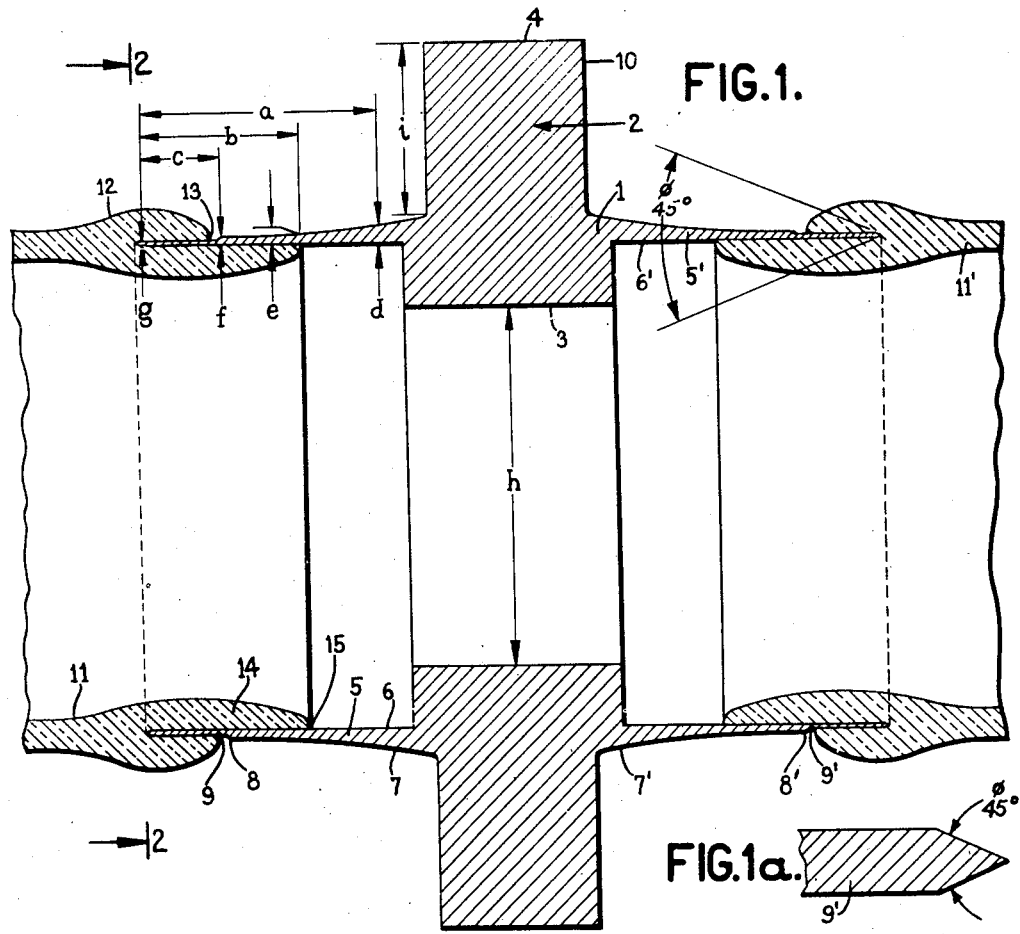
FIG.1.
FIG.1a.
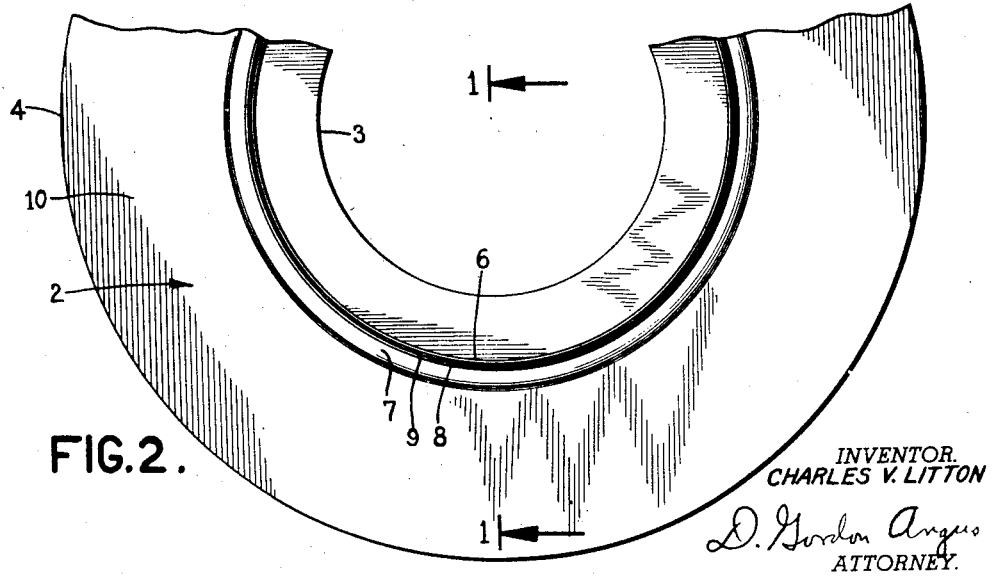
FIG.2.
INVENTOR.
CHARLES V. LITTON
D. Gordon Angus
ATTORNEY.

Patented Dec. 14, 1943

2,336,488

UNITED STATES PATENT OFFICE 2,336,488

METAL SEAL MEMBER

Charles V. Litton, Redwood City, Calif., assignor to International Standard Electric Corporation, New York, N. Y., a corporation of Delaware Application January 31, 1942, Serial No. 429,072

8 Claims. (Cl. 250—27.5)

This invention relates to metallic seal members and particularly to metal members used in making glass-to-metal seals.

The principal object is to provide a metal seal member of a configuration which gives a desired amount of strength to the construction and which does not create rupturing of the seal under the stresses due to heat.

In the making of glass-to-metal seals, especially of the type used in vacuum tubes wherein the vacuum tube envelope is composed in part of a vitreous section and in part of a metallic section, it has been the practice to taper down to a thin sealing edge the metallic section which is to be sealed to the vitreous section. The provision of the thin edge, together with the use of a soft seal metal such as copper, provides a desired degree of pliability to the metal so that the metal will deform when the glass expands and contracts and will not rupture the glass. The use of a very thin sealing surface, while protecting against rupture has its disadvantage of detracting from the strength of the seal member which has a tendency to collapse under changing temperatures.

In accordance with this invention there is provided an especially effective shape of the seal member which provides the desired degree of thinness of the metal where it contacts one portion of the vitreous section, and a sufficient degree of thickness over another portion to prevent collapse and deformation.

The invention will be better understood from the following detailed description when considered in connection with the accompanying drawing in which Fig. 1 illustrates in longitudinal cross-section taken at line 1—1 of Fig. 2, a metal seal shaped in accordance with this invention and sealed to vitreous sections;

Fig. 1a shows an enlarged detail of a portion of the seal shown in Fig. 1; and

Fig. 2 shows a partial end view of the seal member.

In the drawing, the member 1 is the metal seal member, which is preferably of copper as this is easily worked and is a good electrical conductor. This is in the form of a cylindrical collar having a relatively massive base portion 2 with an inner cylindrical surface 3 and an outer cylindrical surface 4. There extend on either side of the base portion 2, sleeves 5 and 5', the inner surfaces 6 and 6' of which are cylindrical. The outer surfaces of the sleeves have a taper 7 and 7' and near the outer end where the sleeve becomes thin a rather sharp taper 8 and 8' down to a feather edge thickness 9 and 9'. The ends of the sleeves are shaped to a sharp angle $\phi$ of about 45°.

It will be understood that the structure shown in the drawing is shown larger than it might actually be and the dimensions are not necessarily shown in proportion. For example, although the thickness $g$ of the feather edge is shown as substantial in the drawing it will ordinarily be very thin. Proper dimensions for the seal are the following:

| | | |
|---|---|---|
| Angle $\phi$ | degrees | 45 |
| Length $a$ | inches | 1/16 |
| Length $b$ | do | 1/8 |
| Length $c$ | do | 1/16 |
| Thickness $d$ | do | .012 |
| Thickness $e$ | do | .006 |
| Thickness $f$ | do | .003 |
| Thickness $g$ | inch | .0015 to .002 |

The internal diameter $h$ of the member may be established as desired to accommodate the electrodes or connections which may be placed in the vessel and passed through it. Likewise, the outside diameter of surface 4 may be established as desired but should be made to receive an electrical connection if the seal is to be used to support one of the tube electrodes, for example, the grid. Also, the length $i$ of the surface 10 should be made sufficient to attach any structures which may be desired such as a concentric line which may be attached to it for the purpose of ultra high frequency tuning.

The usual vitreous envelope section 11 may be sealed to sleeve 5 and a similar envelope section 11' may be sealed to sleeve 5', as shown in the enlarged illustration of Fig. 1. In forming seals for vacuum tube envelopes, it is the practice according to this invention, to have the outer lobe 12 of the vitreous substance extend to only a short distance 13 from the tip of the sleeve and to have the lower lobe 14 extend to a greater distance 15 along the inside of the sleeve. Thus, the part of the metal seal which is sandwiched between the vitreous lobes is only the relatively short feather edge surface 9, which readily deforms with the glass under changes of heat and does not crack the glass. The forming of the extreme end into the angle $\phi$ of about 45 degrees likewise aids in reducing stresses which might tend to crack the glass. Sufficient strength is imparted to the metal seal member by reason of the rapidly increasing thickness from the point 13 to the point 15 where the inner lobe of the glass extends. The thickness $e$ at location 15 is sufficient to maintain the shape of the seal at the high temperatures so that the sealed condition of the inner lobe 14 over the inner cylindrical surface 6 in as far as location 15 enables the shape of the vessel to be maintained, while at the same time the thinness at location 13 prevents cracking.

It is not essential that the thickness increase suddenly from g to f as shown at 8, although this is an especially advantageous formation as it provides the desired thinness at upper lobe 12 and a desired thickness adjacent lower lobe 14. But a more uniform taper might be provided instead, if desired, so long as the relationship of thinness at lobe 12 and thickness at lobe 14 is provided. A convenient method of making the seal member is described and claimed in my copending application Ser. No. 429,073 filed concurrently herewith.

The imperviousness of the seal member to gas leakage through the metal can be greatly improved by cold rolling the sleeve portions and particularly the outer portions of the sleeves from dimension d to the tips. The cold rolling will break down the sizes of the crystals to such dimensions that leakage of gas past the crystals is unlikely to occur. This crystal reduction is particularly efficacious with copper seals, for the copper should ordinarily be annealed before fabricating it into the seal and the annealing is done by heating it, ordinarily in the presence of hydrogen, which has the effect of producing large crystals in the copper. For example, a crystal may be of .080 inch diameter or length or even larger after annealing. When such large crystals are present there is danger of gas seepage past the crystal cleavages especially if the large crystals are in the thin sleeves. Consequently the crystals should not be larger than one-half, and are preferably less than one-tenth the thickness of the metal. By cold rolling the copper, the crystals may be reduced to the optimum length or diameter; and it is found that crystal sizes of about .0025 to .0035 millimeter may be obtained, which is a satisfactory crystal size for the sleeve dimensions given in the example herein. A suitable method of cold rolling the sleeves is disclosed in my said copending application.

The seal member of this invention is especially useful for making the connections to electrodes such as a grid, in a vacuum tube. The electrode support can be attached to the inner cylindrical portion 3 which provides a firm base for the support. The electrical lead can be attached to the outer member 4. The provision of the outer member 4 is also advantageous in providing a support to which a suitable cylinder for use in a coaxial line can be attached if desired.

It will be understood that the invention is not limited to the particular proportions or dimensions given herein, which are given only by way of example; and the invention is only limited by the appended claims.

What I claim is:

1. A metal seal member comprising a cylindrical collar, a sleeve protruding from both sides of the collar, each sleeve having cylindrical inner surfaces, the outer surfaces of said sleeve tapering rapidly from relative thickness at the collar to relative thinness at the outer extremity, the outer edges of said sleeves being shaped to meet at an angle of about 45 degrees.

2. A metal seal member having a collar with an inner cylindrical surface, a pair of sleeves protruding from opposite sides of said collar and having inner diameters larger than that of said cylindrical surface, said sleeves having outer surfaces which taper rapidly from a relatively large thickness at the collar to a relative thinness at a point spaced from their ends, at which point the sleeves suddenly increase in thinness to a feather edge.

3. A glass-to-metal seal comprising a seal member according to claim 2 and a cylindrical glass section sealed at said feather edge, said glass portion having an outer lobe which is sealed over said feather edge and having an inner lobe which is sealed to the sleeve at a location between said sudden increase in thickness and the collar.

4. A seal member having a collar with an inner cylindrical surface, a pair of sleeves protruding from either side of said collar and having inner diameters larger than that of said cylindrical surface, said sleeves having outer surfaces which taper rapidly from a relatively large thickness at the collar to a relatively small thickness at the extremities, said sleeves being in substantially the following proportions: A thickness of .012 inch at a distance of $\tfrac{1}{16}$ inch from the end; a thickness of .006 inch at a distance of $\tfrac{1}{8}$ inch from the extremity; a thickness of .003 inch at a distance of $\tfrac{1}{16}$ inch from the extremity; and a thickness of about .0015 to .002 inch for a distance of about $\tfrac{1}{16}$ inch from the extremity.

5. A metal-to-glass seal of the type in which the metal extends into the glass, comprising a metallic member tapering toward its end to a point spaced from the end, at which point the thickness of said seal member suddenly decreases to a feather edge, and a glass member sealed to said metallic member, said glass member having one extension sealed to and covering the feather edge and part of said tapered portion on one side of said metallic member, and another extension on the opposite side of said metallic member covering only the feather edge.

6. The combination according to claim 5, in which both the metallic and glass members to be sealed together are of tubular cross-section.

7. The combination according to claim 5, in which both the metallic and glass members to be sealed together are of tubular cross-section, and said metallic member is of uniform internal diameter, the taper and sudden decrease in thickness to said feather edge taking place on the external surface of said metallic member.

8. The combination according to claim 5, in which both the metallic and glass members to be sealed together are of tubular cross-section, said metallic member being of uniform internal diameter, the taper and sudden decrease in thickness to said feather edge taking place on the external surface of said metallic member, and in which the larger glass extension lies internally of said metallic tube, the shorter extension projecting about said tube up to the point of such change in thickness.

CHARLES V. LITTON.